Jan. 21, 1958     W. N. DICKERSON     2,820,500
TUBELESS TIRE
Filed Oct. 17, 1956
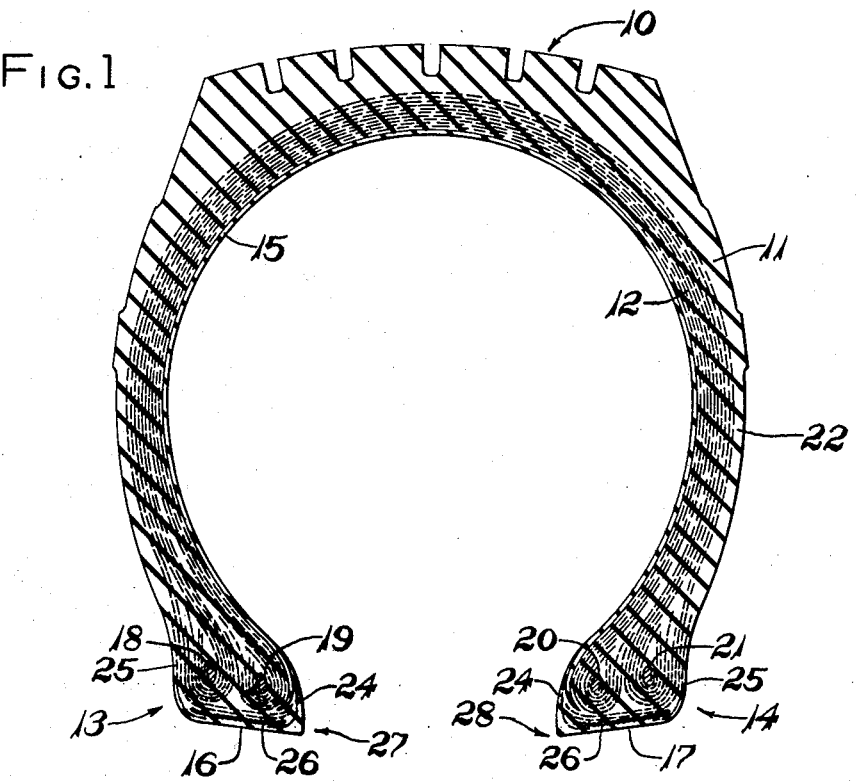
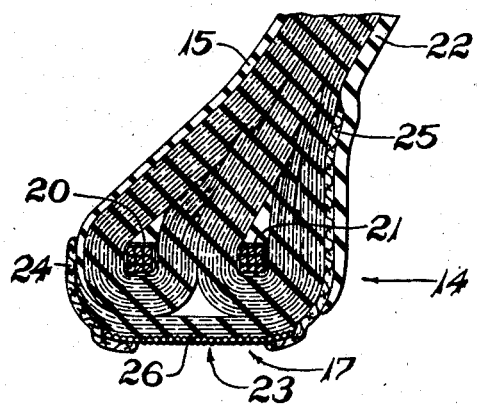
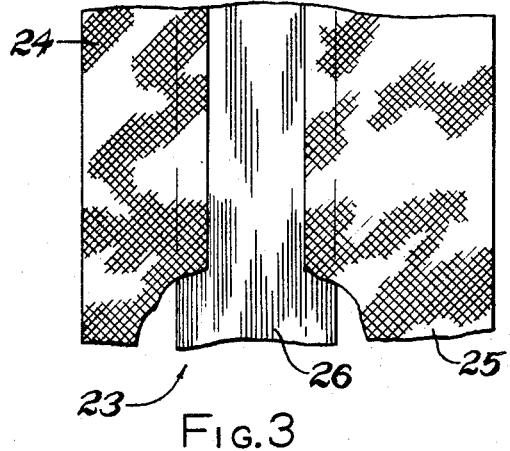
INVENTOR.
WILLIAM N. DICKERSON
BY
W. A. Shira, Jr.
ATTY.

United States Patent Office 2,820,500
Patented Jan. 21, 1958

2,820,500

TUBELESS TIRE

William N. Dickerson, Kent, Ohio, assignor to The B. F. Goodrich Company, New York, N. Y., a corporation of New York Application October 17, 1956, Serial No. 616,562

18 Claims. (Cl. 152—362)

This invention relates to inflatable tubeless tires and, more particularly, to an improved construction for the chafers or finishing strips of such tires.

An inflatable tire of the tubeless type utilizes the tire and the wheel rim on which it is mounted as the chamber for the inflation fluid, which is generally air. In such an assembly, the bead regions of the tire must form a fluid-tight seal with the rim and the interior of the carcass must be sufficiently impervious to the inflation fluid to prevent appreciable loss of the latter. Consequently, the interior of the tire carcass is preferably provided with a lining or layer of substantially impervious elastomeric material and the outer surfaces of the tire beads have an abrasion resistant elastomeric covering. Because the bead regions of a tire are subjected to a certain amount of stress and/or chafing due to flexing of the tire in negotiating corners, curves and irregularities in the roadway, it is customary to provide these regions of the tire with a chafing or finishing strip which is a relatively narrow strip of elastomeric coated fabric formed of twisted multiple filament cords interconnected in a square leno or other weave.

In conventional tire constructions the chafer or finishing strips generally extend exteriorly of the carcass plies from a location within the air containing chamber, provided by the tire and rim, across the bead bases and radially of the tire carcass to locations above the rim flanges. The strips are coated with sufficient elastomeric material to cover the surfaces thereof but the fabric is quite close to the outer surfaces of the tire beads and hence cords of the fabric frequently become exposed either during curing or during subsequent mounting or use of the tire. Such exposure of the cords of the finishing strips provides a passage for the air or other inflation fluid along the exposed cords or through the interstices thereof, the fluid either being lost to the atmosphere or entering into the body of the tire carcass where ply separation or related defects may be produced.

In an effort to eliminate the above-mentioned difficulties encountered with conventional chafer or finishing strips, tubeless tires have been constructed in which such strips are omitted. This omission, however, undesirably reduces the strength of the bead regions as well as their chafe and flex resistance. Moreover, since the elastomeric materials of the bead regions become somewhat fluid during the molding and curing operation, there is a tendency for the ends of the reinforcing plies of the carcass, which are turned about the bead cores, to shift. This further weakens the beads and, when there is no finishing strip, some of the ply cord ends may pull through the elastomeric material or so close to the surface that there is exposure to the inflation fluid in the tire thereby causing loss of pressure and/or premature tire failures due to ply separation, tread separation or other related causes.

The principal object of this invention is, therefore, to provide an improved non-wicking chafer or finishing strip, and an inflatable tubeless tire construction incorporating such chafer or finishing strips, which strips are provided by a fabric that has no components thereof extending continuously from edge to edge thereof, whereby strengthening of the tire beads and proper retention of the ends of the carcass plies are achieved without sacrifice of the imperviousness of this portion of the tire to the inflation fluid contained therein.

A more specific object of the invention is to provide an improved inflatable tubeless tire wherein the beads thereof are provided with non-wicking chafer or finishing strips of composite fabric, the marginal or side portions of which are woven while the central portion is weftless so that no continuous length of yarn or cord in a strip extends transversely thereof from edge to edge of the strip, whereby exposure of a portion of the fabric to the inflation fluid does not provide a path for passage of that fluid from the inflation chamber.

Another object of the invention is to provide an improved construction for inflatable tubeless tires of the sizes used in trucks and aircraft having beads with wide bases wherein the beads are each provided with a non-wicking finishing strip of fabric with the cords of the strips so disposed as to facilitate incorporation in the tire and shaping of the latter and wherein no continuous length of cord extends transversely of a strip from edge to edge thereof nor across the base of the bead in which the strip is incorporated.

The invention further resides in certain novel features of the improved finishing strip and of a tire in which the improved strip is incorporated, and further objects and advantages of the invention will be apparent to those skilled in the art to which it pertains from the following description of the presently preferred embodiment, taken in conjunction with the accompanying drawing, forming a part of this application, and in which:

Fig. 1 is a fragmentary transverse sectional view through an inflatable tubeless tire constructed in accordance with this invention;

Fig. 2 is an enlarged fragmentary sectional view of one bead of the tire shown in Fig. 1, after the tire has been shaped but before curing, more clearly illustrating the construction; and Fig. 3 is a plan view of the portion of the strip shown in Figs. 1 and 2, on a somewhat larger scale, more clearly showing the nature of the composite fabric.

Referring first to Fig. 1 of the drawing, the inflatable vehicle tire illustrated therein includes a tread portion 10 surrounding an annular inner carcass 11 of resilient elastomeric material, such as natural or synthetic rubber, and reinforcing cords, the latter being disposed in superposed plies 12. The inner periphery of the tire is defined by spaced bead portions 13 and 14 which are adapted to fit on the rim of a vehicle wheel and cooperate therewith to provide a chamber for the air or other inflation fluid without the need of a separate tube or container. Therefore, the interior of the tire carcass is preferably provided with a layer or lining 15 of an impervious elastomeric material such as the isoolefin-diolefin copolymer commonly known as butyl rubber.

The principles of this invention may be applied to inflatable tubeless tires of any size but the present field of greatest utility is in tires of the larger sizes used for large airplanes and trucks. Such tires generally require in excess of six reinforcing plies 12 in the carcass and may employ more than one bead core in each bead region with resulting wide bead bases. A tire of this type is illustrated in Figs. 1 and 2 which shows a ten-ply tire, the bead regions 13 and 14 of which have wide bases 16 and 17 which are the result of employing two bead cores 18, 19 and 20, 21 in the bead regions 13 and 14, respectively. The tire here shown is constructed by superposing four plies of rubberized cord upon the layer or liner 15 and turning these plies about the bead cores 19 and 20 in a manner which will be readily understood by those skilled in the art from inspection of Fig. 2. The next four plies of rubberized cord comprising reinforcements of the carcass are then superposed upon the first four plies and the ends of the fifth to eighth plies are turned about the bead cores 18 and 21. Thereafter, the ninth and tenth plies are placed upon the carcass and the ends thereof are turned about both the bead cores and ply ends of each bead to establish the bead bases 16 and 17.

As mentioned heretofore, it is customary to incorporate a chafer or finishing strip externally of the ply ends in each bead base of a tire. Such strips commonly have their inner edges located within the interior of the tire carcass just above the bead toes from which location the strips extend across the bead bases and radially of the tire side walls a distance such that the upper edges of the strips are above the outer edges of the flanges of the tire rim on which the tire is adapted to be mounted. These finishing strips are normally provided with a coating of elastomeric material so that during curing of the tire there is union of the layer or liner 15, the carcass plies 12, and the outer covering or side wall rubber 22 which is placed over the cord plies 12 and which may be applied as extensions of the tread slab 10 during construction of the tire. During the curing and molding operations of the tire, the outer side surfaces of the beads may be provided with circumferentially extending sealing ribs or projections to provide sealing engagement with the side flanges of the rim on which the tire is positioned in service or, if the tire is to effect sealing engagement with the rim at the bead seats of the rim, the bead cores are so placed and the tire molded such that the bead bases have appropriate taper for such sealing cooperation as will be understood by those skilled in the art.

The finishing or chafer strips normally employed in conventional constructions comprise a fabric formed of a plurality of cords each comprising a plurality of filaments twisted together to provide good flex resistance, the cords being arranged in a weftless or woven form such that the individual cords extend at an acute angle with respect to the bead cores. Use of such conventional fabrics in tubeless tires, however, frequently results in difficulties caused by passage of inflation fluid along the cords or between the individual filaments thereof due to the cords becoming exposed either during cure of the tire, or during mounting or use upon the wheel rim. This passage of fluid, known as wicking, results in loss of inflation pressure when the cord communicates both with the interior of the tire and the atmosphere. A more serious condition, however, occurs when the inflation fluid thus permeating a cord or cords of the finishing strip cannot vent externally of the tire since such fluid then is conducted into the body of the tire and forms a pocket or pockets therein which result in ply and/or tread separation.

Attempts to prevent wicking of fabrics utilized as chafer or finishing strips by merely providing thicker layers of rubber or other elastomeric material upon the conventional weftless, square woven or leno weave fabric have been unsuccessful since, as mentioned heretofore, the elastomeric material is substantially fluid during curing of the tires so that the cords of the fabric can still become exposed during molding or move so close to the surface that there is exposure of a portion of the cords after only relatively minor chafing or flexing of the beads. Employing monofilaments as the reinforcements of the finishing strip eliminates the possibility of wicking through the filaments but not along the exteriors thereof, which may occur when the bonding of the elastomeric covering to the reinforcement fabric is not complete. Moreover, monofilament fabric does not possess the optimum flex resistance and other characteristics desired in a finishing strip.

In accordance with this invention, the advantages of employing a chafer or finishing strip formed of twisted multifilament yarns or cords are retained, while the difficulties of fluid wicking therealong or therethrough are eliminated, by employing in such strips a composite fabric in which the component portions are so arranged that no continuous length of a cord or filament extends from edge to edge of the strip or across the bead faces 16 and 17 of the tire. Hence, even if the cords or filaments of such a strip should have a portion accessible to the inflation fluid the latter cannot pass from the inflation chamber to the atmosphere nor into the body of the carcass.

Referring now to Fig. 3 of the drawing, which shows the improved finishing or chafer strip 23 to a larger scale than in Figs. 1 and 2, it will be observed that this strip includes two different types of fabric construction united together to form a composite unitary member. Thus, the margin or side portions 24 and 25 comprise a woven fabric formed of intersecting or interwoven cords each of which is preferably multifilament in nature and twisted to provide the flex resistance properties characteristic of such cords. These marginal portions 24 and 25 of the chafer or finishing strip may have the cords thereof disposed in a square woven, leno, or other known weave and preferably the cords are so arranged that they extend at acute angles to the length of the strip 23. The margin or side portions 24 and 25 are laterally spaced from each other and between these portions is a strip 26 of weftless fabric, the edges of which are united with the adjacent edges of the portions 24 and 25. The weftless fabric 26 is formed by a plurality of parallel cords arranged so that they extend generally in the direction of the length of the strip 23, or at only a slight angle with respect thereto. Each cord of the weftless strip 26 is preferably formed of a plurality of twisted filaments, individual cords of the fabric being united together by elastomeric material as is well known in the art of tire fabric manufacture.

The several portions of the composite finishing strip 23 may be prepared from known fabrics now used in tire construction and may be treated by conventional procedures employed in preparing such fabrics. Thus, the margin or side portions 24 and 25 may be of the square woven or leno type fabrics now commonly employed in chafer or finishing strips, the cords of which may be cotton, rayon, nylon or other suitable textile fibers. The weftless portion forming the central part or portion 26 of the strip may likewise have the cords of cotton, rayon, nylon or other suitable textile fibers twisted together and with the fabric prepared in the manner similar to that now employed in forming the carcass plies 12. Preferably, the finishing strip 23 is made by separately providing lengths of interwoven material and weftless material of appropriate widths for handling with conventional dipping and calendering equipment and the fabrics are thus provided with a coating of elastomeric material. For example, if the cords of the fabric are rayon, nylon or similar materials, they may be first dipped in a resorcinol formaldehyde latex dispersion or other known adhesive promoting material after which the excess of adhesive material is removed and a coating of rubber applied by passing the fabric through a calender. Appropriate widths of the square woven and weftless material are then cut and assembled by splicing the materials together with the weftless portion intermediate the interwoven portions as indicated in Fig. 3, the edge portions of the several parts of the strip being united by the adhesion of these portions together due to the normal tackiness of the coating on the fabric. As shown in Fig. 3, the adjacent edges of the portions 24, 25, and 26 are joined by lap splicing which is presently preferred because it facilitates transmittal of forces transversely of the several strip portions. However, it will be understood that it is possible to employ splicing connections other than the overlap splice here shown.

After the fabrics forming the margin or side portions 24 and 25 and central portion 26 of the composite strip 23 have thus been assembled, the strip may, if desired, be provided with an additional coating of elastomeric material on one or both sides of the composite fabric, this being applied by a calendering or equivalent operation. Such elastomeric coating may be the same on both faces of the strip or the coating on one face may be of a different composition from the elastomeric coating provided on the other face of the strip.

The composite finishing strips 23 are prepared of a width suitable to extend from a location slightly above the bead toes 27 and 28 of the tire across the bases 16 and 17 thereof and radially outwardly of the bead bases in the side walls of the tire to a location which is beyond the outer limit of the rim flange on which the tire will be mounted. The finishing strips 23 are applied to the uncured tire after the liner 15 and carcass plies 12 have been assembled and the latter turned around the bead cores 20 and 21, the inner edge portion of the finishing strip 23 contacting and adhering to the elastomeric material forming the liner 15. The other edge of the finishing strip in each bead extends on the outer side face of the tire bead, as mentioned above, and is disposed inwardly of the lower edge of the side wall stock 22, as is indicated in Fig. 2, so that the side wall stock is in contact with and overlies the edge of the strip. A strip of rubber may be placed over the finishing strip in each bead, if desired, before the tire is cured.

It will be observed that the woven portions of the composite finishing strip fabric extend over the bead toe and heel portions of the tire and to the substantially conical part of the bead base in each bead region of the tire while the weftless fabric 26 is located only in the bead base portion of each bead region. This arrangement of the fabrics facilitates shaping of the fabric about the beads during building of the tires and proper distribution of the materials during the subsequent shaping and curing operations.

The importance of the angular relationship of the finishing strip cords in the regions of the bead toes and heels during the shaping operation will be readily understood from a consideration of the usual tire building and shaping procedures. Thus, when tires of smaller sizes, such as those used on passenger cars and light trucks are built by the flat band method, the conventional toroidal shape of the completed tire is achieved by moving the bead regions of the tire toward each other subsequent to the building operation. This results in a partial rotation of the bead regions causing changes of diameter in the vicinities of the bead toes and heels which changes are accommodated by shifting of the cords in the side portions 24 and 25 of the finishing strips. This shifting is possible since the weave of the fabric in these portions is relatively open and the angles of the cords are such that the cords can change their angular relationship as is well known in the art. The cords in the bead base portions 16 and 17 of the tire do not undergo any appreciable change in length during the shaping and curing operation and hence these may extend circumferentially of the bead cores as shown. Tires of larger sizes, such as those having multiple bead cores as illustrated in the drawing, are generally built in a manner such that the bead regions are not subjected to partial rotation during the subsequent shaping operation. Nevertheless, the shaping and curing operations also require ability of the cords of the finishing strip to shift in the bead toe and heel regions.

The tire construction as is herein described and illustrated has the improved characteristics that there is no leaking or wicking of the inflation fluid through the bead regions of the tire when the latter is mounted upon a suitable rim. This is so even though a portion or portions of the fabric of the finishing strip be exposed to the inflation fluid. Thus, if any of the cords in the inner portion of the composite strip be exposed, fluid which may pass therealong cannot travel further than the edge of that portion of the finishing strip due to the termination of the cords and the lack of connection between the passages which exist within these and the other cords of the fabric. Moreover, this inflation fluid cannot enter the carcass of the tire due to the elastomeric material coating the strip and which is disposed between the fabric of the strip and the adjacent tire plies. Likewise, should any of the cords in the portion 26 of the finishing strip be exposed, no path is provided by these cords for the fluid which permits the latter to move transversely of the strip or into the body of the carcass of the tire. Because of the location of the side portion 25 of the strip, inflation fluid cannot reach these cords since they are not accessible to the inflation chamber either directly or through any communication with passages or interstices between or through the other cords of the fabric.

The preferred embodiment of the invention has been described and illustrated as comprising woven fabric for the margins or side portions 24 and 25 of the strip. It will be apparent, however, that the principles of this invention and the advantages thereof can be secured by employing other types of fabric for these portions so long as they can be accommodated to the change of shape of the tire during the building, forming and curing operations. By way of example, it may be mentioned that in place of woven fabrics in portions 24 and 25, the latter may comprise a knitted fabric or the portions 24 and 25 may be formed of two plies of weftless fabric superposed with the cords in each ply parallel and at an angle to each other and to the length of the strip. These and other equivalents or adaptations of the material herein specifically set forth are considered as encompassed within the ambit of this invention which is deemed limited only as required by the spirit and scope of the appended claims.

Having thus described the invention, I claim:

1. A non-wicking finishing strip for tubeless inflatable tires comprising a plurality of lengths of fabric extending longitudinally of the strip and united along adjacent longitudinal edge portions with the cords in the side portions of the strip discontinuous from and disposed at an angle with respect to the cords in the central portion of the strip.

2. A non-wicking finishing strip for tubeless inflatable tires comprising a plurality of multifilament cords united by a coating of elastomeric material, the cords in the central portion of the strip extending generally longitudinally of the strip and the cords in either side portion of the strip being discontinuous from and disposed at an angle relative to the cords of the central portion.

3. A non-wicking finishing strip for tubeless inflatable tires comprising a plurality of lengths of fabric extending longitudinally of the strip and united along adjacent longitudinal edge portions with the cords in the central portion of the strip extending generally parallel and longitudinally of the strip and the cords in the side portions extending at angles relative to each other and to the length of the strip.

4. A non-wicking finishing strip for tubeless inflatable tires comprising laterally spaced lengths of woven fabric, a length of weftless fabric intermediate the lengths of woven fabric with the individual cords of the weftless fabric extending generally longitudinally of the finishing strip, and a coating of elastomeric material on each of said lengths of fabric adhering the said lengths together along their longitudinal edges.

5. A non-wicking finishing strip for tubeless inflatable tires comprising a rubber coated elongated strip of fabric the longitudinal side portions of which are formed by interwoven cords and the intermediate portion of which is formed by a plurality of parallel weftless cords extending longitudinally of the strip.

6. A non-wicking finishing strip for tubeless inflatable tires comprising elastomeric coated laterally spaced lengths of woven fabric and an elastomeric coated length of weftless fabric intermediate the lengths of woven fabric with the individual cords of the weftless fabric extending longitudinally of the finishing strip and with the longitudinal edges of said lengths of fabric united to each other by adhesion of their elastomeric coatings.

7. A non-wicking finishing strip for tubeless inflatable tires comprising a rubber coated elongated strip of fabric the longitudinal side portions of which are formed by intersecting warp and weft cords and the intermediate portion of which is formed by a plurality of parallel weftless cords extending longitudinally of the strip with the adjacent edge regions of the said intermediate and edge portions spliced together.

8. In a tubeless inflatable tire having spaced circumferentially extending beads, a non-wicking finishing strip in each bead comprising a composite cord-containing fabric including a plurality of circumferentially extending portions united along their adjacent edges with the cords in the side portions of the strip being discontinuous and disposed at an angle with respect to the cords in the central portion of the strip.

9. In a tubeless inflatable tire having spaced circumferentially extending beads, a fabric reinforced non-wicking finishing strip in each bead comprising circumferentially extending side portions formed of a plurality of interwoven cords and a central portion formed of parallel weftless cords extending circumferentially of the bead.

10. In an inflatable tire having a cord reinforced elastomeric carcass with spaced circumferentially extending beads, a fabric reinforced non-wicking finishing strip in each bead comprising circumferentially extending side portions formed of a plurality of interwoven cords and a central portion formed of parallel weftless cords extending circumferentially of the bead, and elastomeric material on each strip united to the elastomer of the carcass.

11. In a tubeless inflatable tire having spaced circumferentially extending beads, an outer covering of elastomeric material, and an air impervious elastomeric lining, a fabric reinforced non-wicking finishing strip in each bead comprising circumferentially extending portions of woven fabric on the side faces of the beads and a central portion of parallel weftless cords on the bead base with the said cords extending circumferentially, and elastomeric material on the strip united with said lining and covering of the tire.

12. In a tubeless inflatable tire comprising a carcass provided with spaced circumferentially extending beads, a finishing strip incorporated in each of said beads with each strip extending laterally of a bead base and outwardly therefrom to a region in the outer side wall of the tire, the said strips each comprising an elastomer coated composite fabric formed by a plurality of circumferentially extending cord-containing portions united along their adjacent edges with the cords in the portions of the strip in each bead extending over the toe and heel of that bead being discontinuous and disposed at an angle with respect to the cords in the central portion of the strip.

13. In a tubeless inflatable tire having spaced circumferentially extending beads, a non-wicking finishing strip incorported in each of said beads with each strip extending laterally of a bead base and radially outwardly therefrom to a region in the outer side wall of the tire, the said strips each comprising an elastomer coated composite fabric formed by a central portion of weftless parallel cords extending circumferentially of the tire on a bead base and side portions of interwoven warp and weft cords extending over the toe and heel portions of the beads.

14. A tubeless inflatable tire comprising a hollow annular body of resilient elastomeric material open at the radial inner portion and having wheel engaging bead portions at the inner periphery, a non-wicking finishing strip in each of said bead portions with edges of said strips extending a limited distance beyond the wheel-engaging region of the bead portion in which it is incorporated, said strips each comprising a composite fabric including weftless parallel cords extending circumferentially of the tire beads in the bead base and side portions of woven fabric extending over the bead toes and heels, and elastomeric material on the said strips united with the elastomeric material of the body.

15. A tubeless inflatable tire comprising a hollow annular body of resilient elastomeric material open at the radial inner portion and having wheel-engaging bead portions at the inner periphery, circumferentially extending bead cores disposed in the bead portions, reinforcing cord plies embedded in said annular body and extending from bead portion to bead portion with the edges of the plies turned around said bead cores, a non-wicking finishing strip in each of said bead portions outwardly of said reinforcing plies with edges of said strips extending a limited distance beyond the wheel-engaging region of the bead portion in which it is incorporated, said strips each comprising a composite fabric including weftless parallel cords extending circumferentially of the tire beads in the bead base and side portions of woven fabric extending over the bead toes and heels, said woven fabric portions being disposed with the cords thereof at acute angles relative to the weftless cords, and elastomeric material on said strips united with the elastomeric material comprising the outer and inner surfaces of the tire.

16. A tubeless inflatable tire comprising a hollow annular body of resilient elastomeric material open at the radial inner portion and having wheel engaging bead portions at the inner periphery, circumferentially extending bead cores disposed in the bead portions, reinforcing cord plies embedded in said annular body and extending from bead portion to bead portion with the edges of the plies turned around said bead cores, an impervious elastomeric lining on the interior of the carcass, a strip of textile material embedded in each of said bead portions outwardly of said reinforcing plies with the edges of said strips extending a limited distance beyond the wheel-engaging region of the bead portion in which it is incorporated, said strips each comprising a composite fabric including weftless parallel cords extending circumferentially of the tire beads in the bead base and side portions of woven fabric extending over the bead toes and heels, said woven fabric portions being disposed with the cords thereof at acute angles relative to the weftless cords, and elastomeric material on said strips united with the lining and with the material comprising the outer surface of the tire.

17. A tubeless inflatable tire comprising a hollow annular body of resilient elastomeric material open at the radial inner portion and having wheel-engaging bead portions at the inner periphery, circumferentially extending bead cores disposed in the bead portions, reinforcing cord plies embedded in said annular body and extending from bead portion to bead portion with the edges of the plies turned around said bead cores, an impervious elastomeric lining on the interior of the carcass, a strip of textile material embedded in each of said bead portions outwardly of said reinforcing plies with the edges of said strips extending a limited distance beyond the wheel-engaging region of the bead portion in which it is incorporated, said strips each comprising a composite fabric including weftless parallel cords extending circumferentially of the tire beads in the bead base and side portions of square woven fabric extending over the bead toes and heels, said square woven fabric portions being disposed with the cords thereof at acute angles relative to the weftless cords, and elastomeric material on each of said strips united with the materials comprising the liner and the outer surface of the tire.

18. A tubeless inflatable tire comprising a hollow annular body of resilient elastomeric material open at the radial inner portion and having wheel-engaging bead portions at the inner periphery, at least two circumferentially extending bead cores disposed in each bead portion, at least six reinforcing cord plies embedded in said annular body and extending from bead portion to bead portion with the edges of some of the plies turned around some of said bead cores and the others of said plies turned about the other bead cores, an impervious elastomeric lining on the interior of the carcass, a strip of textile material in each of said bead portions outwardly of said reinforcing plies with the edges of said strips extending a limited distance beyond the wheel-engaging region of the bead portion in which it is incorporated, said strips each comprising a composite fabric including weftless parallel cords extending circumferentially of the tire beads in the bead base and side portions of woven fabric extending over the bead toes and heels, said woven fabric portions being disposed with the cords thereof at acute angles relative to the weftless cords, and elastomeric material on each of said strips united with the material comprising the outer and inner surfaces of the tire.

References Cited in the file of this patent

UNITED STATES PATENTS

| | | |
|---|---|---|
| 1,563,672 | Stover | Dec. 1, 1925 |

FOREIGN PATENTS

| | | |
|---|---|---|
| 640,658 | France | Apr. 2, 1928 |